April 5, 1932.   C. J. HANSEN   1,852,160
GAS PURIFICATION
Original Filed Aug. 20, 1928
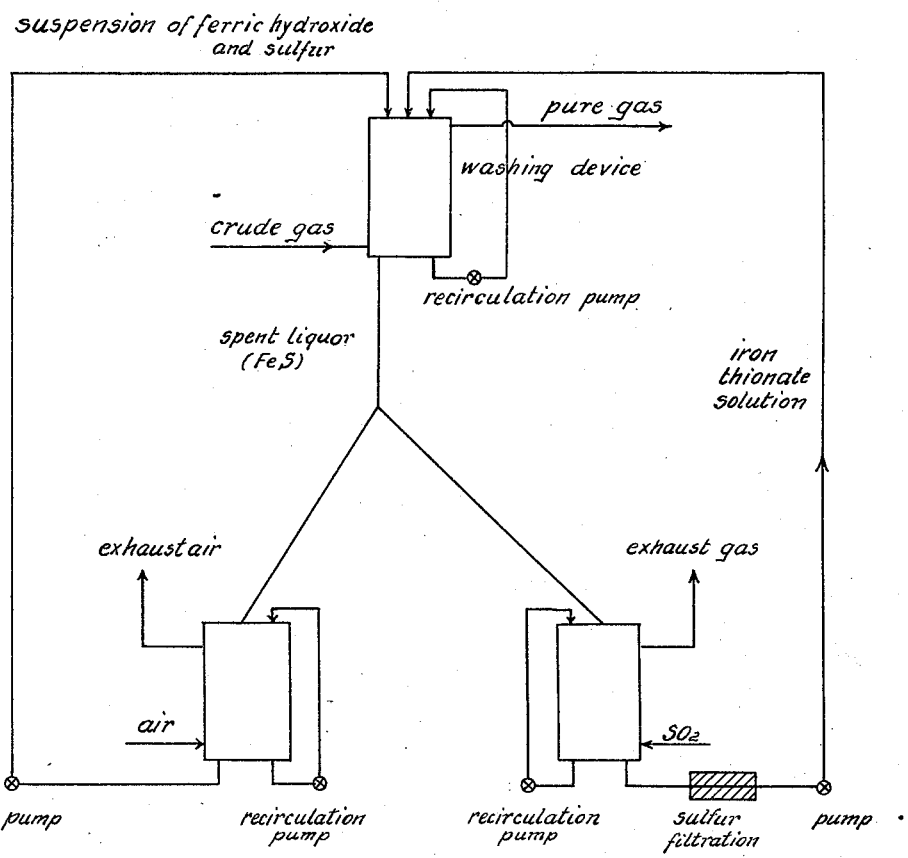
Inventor:
Christian J. Hansen
by Karleusham
Atty.

Patented Apr. 5, 1932

1,852,160

UNITED STATES PATENT OFFICE

CHRISTIAN J. HANSEN, OF ESSEN-RUHR, GERMANY, ASSIGNOR, BY MESNE ASSIGNMENTS, TO THE KOPPERS COMPANY, OF PITTSBURGH, PENNSYLVANIA, A CORPORATION OF DELAWARE

GAS PURIFICATION

Original application filed August 20, 1928, Serial No. 300,945, and in Germany October 22, 1927. Divided and this application filed December 4, 1929. Serial No. 411,685.

My invention refers to the treatment of gases, more especially gases such as result in the distillation of coal and other carbonaceous material. It is a particular object of my invention to provide means whereby the ammonia and sulfur which are contained in such gases, the latter mostly under the form of hydrogen sulfide, can be recovered from the gases in an easier and more perfect manner than was hitherto possible.

It is known to recover the ammonia and hydrogen sulfide from gases by means of solutions of metal thionates. In this process there results metal sulfide and a solution of ammonium thionate and in some cases also free sulfur.

The metal sulfide, which may be ferric sulfide, manganese sulfide or zinc sulfide is redissolved by acting thereon with sulfur dioxide and there results a metal thionate solution and free sulfur. This solution has hitherto been treated further in such manner that the solution containing, besides sulfur, metal and ammonium thionates in solution, was decomposed by heating into sulfate and sulfur, and the metal (iron, manganese or zinc) was removed by treating the sulfate solution with fresh gas before starting the gas purification process proper.

The process above described involves the great disadvantage that in the case where iron is present, iron disulfide ($FeS_2$) is obtained, which is not soluble in sulfur dioxide and other acids.

The metal thionate solutions described are further able only to take up ammonia and hydrogen sulfide in the predetermined proportion of $2NH_3 : 1H_2S$. Now in view of the fact that the gases resulting for instance in the distillation of coal always contain more hydrogen sulfide (gas resulting in the distillation of Ruhr coal about 50 per cent, English coal partly 100 to 200 per cent more than corresponds to the above proportion), a process of purification as above described always leaves a more or less considerable proportion of hydrogen sulfide in the gas.

It is further known to remove hydrogen sulfide from gases free from ammonia by different means such as—

1. Solutions of polythionates,
2. Solutions of thiosulfates, to which sulfur dioxide is added,
3. Suspensions of ferric hydroxide.

The means recited above for recovering the hydrogen sulfide differ as regards their velocity of reaction.

The slowest acting is the solution of polythionates, while a thiosulfate solution, to which sulfur dioxide is added, will act somewhat more quickly. However the velocity of reaction of these solutions is always so small that in the case of a polythionate solution and a gas containing for instance 0,8 per cent $H_2S$, only 33 per cent of the hydrogen sulfide can be removed, with a solution of thiosulfate and sulfur dioxide only about 50% per unit of time.

On the other hand a suspension of ferric hydroxide will act on a gas washing liquor having neutral or slightly alkaline reaction so favorably that the total removal of hydrogen sulfide can be effected under commercial conditions.

Unfortunately the use of suspensions of ferric hydroxide involves the great disadvantage, that when the spent washing liquor is regenerated with air or another gas containing oxygen, there results a mixture of ferric hydroxide and sulfur and the separation of the sulfur from the iron sludge is very expensive. One is further forced to keep the percentage of iron in such solutions as low as possible in order to obtain the most favorable proportion between the sulfur and the iron. This entails the drawback, that the absorbing capacity of such washing liquor for hydrogen sulfide is comparatively small.

With an iron content of about 2 kgs. per cubic meter of the solution, not more than 100 cubicmeter gas can be treated at the utmost.

In my copending application for patent of the United States, Serial Number 300,945, I have described a method of treating coke oven gases for the recovery therefrom of useful admixtures, which allows obviating the drawbacks inherent in both absorption modes by carrying them out in succession. It consists in treating the gas with a suspension of iron or manganese hydroxide to remove part of the hydrogen sulfide, whereupon the gas is washed with a solution of iron or manganese thionate, by which the residual hydrogen sulfide and ammonia are absorbed.

This method allows removing, besides the ammonia contents, all the hydrogen sulfide from a gas irrespective of the ratio of the contents of these two admixtures and more particularly from a gas which contains even less than $2NH_3$ per $1H_2S$. On the other hand the elementary sulfur obtained can readily be recovered in a pure state free of ferric or manganese hydroxide by mixing the two different washing liquors when spent, dividing the mixtures into two parts and separately regenerating each part by treating it with air or sulfur dioxide, respectively. While the suspension of free sulfur and ferric or manganese hydroxide obtained by blowing with air is immediately reused, the liquor obtained by the introduction of sulfur dioxide which contains iron or manganese thionates in solution and elementary sulfur in suspension, is first filtered, whereby the sulfur is obtained in a pure state free of ferric or manganese hydroxide.

This method, which is applicable irrespective of whether the so-called direct, semidirect or indirect way of separating the bulk of the ammonia is used, renders it necessary to employ and to control at least two different washing stages. It can be simplified in accordance with the present invention by washing the gas with a single washing liquor, which contains iron or manganese hydroxide in suspension and thionates of one or both of such metals in solution. If the gas is brought in contact with such combined washing liquor, it will absorb from the gas ammonia and hydrogen sulfide in any desired ratio, the iron or manganese thionate combining with the total contents of ammonia and one-half of the equivalent quantity of hydrogen sulfide, while the ferric or manganese hydroxide combines with the residual hydrogen sulfide. In both reactions ferric or manganese sulfide and free sulphur are formed. The spent washing liquor is regenerated in such manner that it is divided into two portions, one of which is converted into an iron or manganese thionate solution by treatment with sulfur dioxide, while the other is treated with air to produce ferric hydroxide. The regenerated suspension of ferric or manganese hydroxide and the regenerated solution of thionates, from which free sulfur may be filtered off, are then mixed and returned into the washing apparatus.

It will be understood that free sulfur is formed in the new process in various ways during the washing stage as well as in the two regeneration stages. In the washing liquor ferric hydroxide reacts with hydrogen sulfide according to the equation:

$$2Fe(OH)_3 + 3H_2S = 2FeS + S + 6H_2O \quad (1)$$

Ferric or manganese polythionates contained in the washing liquor react with hydrogen sulfide in the presence of ammonia in different ways, whereby free sulfur is formed, for instance by the following reaction:

$$FeS_4O_6 + 4H_2S + 2NH_3 = \\ (NH_4)_2S_2O_3 + FeS + 5S + 3H_2O \quad (2)$$

When regenerating part of the spent washing liquor with air sulfur is obtained by the reaction $$2FeS + 3O + 3H_2O = 2Fe(OH)_3 + 2S \quad (3)$$

The other portion of the spent liquor, when regenerated by means of sulfur dioxide, yields another quantity of free sulfur according to reactions of the following types:

$$2FeS + 3SO_2 = 2FeS_2O_3 + S \quad (4)$$
$$2FeS_2O_3 + 3SO_2 = 2FeS_3O_6 + S \quad (5)$$

The recovery of these various quantities of sulfur takes place, in the practice of my invention, at the point where the washing liquor, when regenerated by means of sulfur dioxide, contains no solid materials other than sulfur, all the iron or manganese being present in the form of dissolved thionates.

It will further be understood, that this recovery, or filtering off, of sulfur immediately after the mentioned regeneration step, yields not only the amounts of sulfur which are formed during this one step, but involves also the recovery of part of the quantities of sulfur formed in the other regeneration step as well as in the washing step proper, as all these liquors are later on partly subjected to the regeneration by means of sulfur dioxide.

It has already been suggested to recover hydrogen sulfide and ammonia from coal distillation gases by washing same with a liquor containing sulfides and thionates of iron, zinc or manganese, whereby this liquor is alternately or simultaneously regenerated by introducing sulfur dioxide. Only when starting this process a suspension of the hydroxides of these metals is used, which are soon converted into the sulfides and their derivatives. In contradistinction therefrom my invention is limited to the step of maintaining in the washing liquor a contents of unconverted metal hydroxide substantially throughout the washing period, the formed metal sulfide being preferably regenerated by treating part of the spent washing liquor with air or other gas mixtures containing oxygen.

When producing ferric hydroxide in the spent washing liquor by treating same with air, it is astonishing to find that the oxidation of the ferric sulfide is not disturbed by the presence of the thionates in the solution, which may amount to 50 per cent and more; no such process has hitherto been suggested.

A particular technical advantage of the new mode of operating consists therein, that it can easily be adapted to widely differing conditions of operation and to all kinds of apparatus.

The purification effect is practically independent from all variations in the composition of the gas and in the production, more especially when different kinds of gas are produced.

In the flow sheet affixed to this specification and forming part thereof my invention is illustrated by way of example.

By the repeated regeneration and recirculation of the washing liquor used in my process the contents of ammonium thionates thereof is gradually increased. I may withdraw part of the liquid periodically or continuously and recover the ammonium salts contained therein in any suitable way, for instance by filtering off sulfur and metal sulfide from part of the spent liquor, and heating the filtrate in order to convert the thionates into sulfates and free sulfur. If the liquor subjected to this treatment contains some metal thionates, it must be treated later on with hydrogen sulfide and ammonia in order to precipitate and separate the metals under the form of sulfides, which can be reintroduced into the washing cycle. However, in contradistinction to this hitherto employed method, I prefer inserting the step of freeing the liquor from metals at the point before the sulfate is formed, as only by so doing the formation of ferric disulfides ($FeS_2$) can be prevented, which cannot be dissolved by treatment with sulfur dioxide.

At any rate the precipitated and filtered-off metal sulfides should be reintroduced into the process, preferably by adding them to that portion of the spent washing liquor which is to be treated with sulfur dioxide.

My invention at the same time enables me to extract from the gas also the cyanogen or its compounds contained therein, and to convert same into ammonium thiocyanate, from which can then be obtained ammonium sulfate and sulfur in the manner described in my copending application for Letters Patent of the United States for "Improvements in treating thiocyanates", Ser. No. 298,617.

In this copending application I have shown that if ammonium thiocyanate is decomposed hydrolytically within the washing liquor, which results in the purification of coal distillation gases, such washing liquor containing either polythionates or corresponding quantities of thiosulfate and sulfur dioxide combined therewith, the two being converted into polythionates, or if such salts or sulfur dioxide or both are introduced into the liquor, or if ammonium bisulfite or ammonium sulfite are present therein, ammonium sulfate and free sulfur will result. I have further shown that these conversions of ammonium thiocyanate take place slowly at ordinary temperature and more rapidly at an elevated temperature, more especially under pressure, preferably at a temperature varying between 140–160° C.

As all the washing liquors used in the purification of the gas contain free sulfur and as the suspensions of ferric hydroxide as well as the iron thionate solutions can contain some ammonia during the washing procedure, they will also absorb from the gas all cyanogen compounds, which are converted into ammonium thiocyanate. When treating the spent washing liquors for the production of ammonium sulfate and sulfur, the ammonium thiocyanate is also converted into ammonium sulfate and free sulfur.

Thus the yield of ammonium sulfate in a gas washing process is materially increased for the first time. It is well known that the cyanogen compounds in the gas are formed thereby, that part of the ammonia present in the gas, being primarily formed from the nitrogen in the coal when acted upon by the incandescent coal and the hot products of distillation, is converted into cyanogen compounds. Thereby hitherto a material proportion of the ammonia, about 10–20% and more, was decomposed. The present process therefore enables me to obtain 10–20 per cent and more ammonium sulfate in excess of the quantity hitherto obtainable.

*Example 1.*—A coke oven gas which at a temperature above its dew point contains about 8 grs. $NH_3$, 12 grs. $H_2S$ and 1,7 grs. cyanogen compounds (calculated as hydrocyanic acid) per cubicmeter, is washed in accordance with the method described above with a liquor containing about 10–50 kgs. iron per cubicmeter partly in the form of suspended ferric hydroxide and partly in the form of dissolved thionates. The total contents of hydrogen sulfide, ammonia and cyanogen compounds is extracted by the washing liquors which may have an ammoniacal reaction. The spent liquor contains iron in the form of FeS and free sulfur in suspension, and, besides, ammonium thionates and ammonium thiocyanate in solution. It is divided into two portions. One portion, preferably one third of the total amount, is treated with air, whereby the metal sulfides are converted into metal hydroxides and free sulfur, and is then reused in cycle. The other portion is treated with sulfur dioxide, whereby the metal sulfides are redissolved under the formation of thionates. The free sulfur remaining in suspension is then filtered off, whereupon this portion is also reused in cycle.

When the liquor has become rich enough in ammonium salts, I periodically or continuously withdraw part of the spent liquor for the recovery of ammonium sulfate. I treat this portion first with an excess of fresh gases in order to precipitate all the dissolved metal compounds under the form of sulfides, which are filtered off together with free sulfur and reintroduced in the process. The filtrate thus obtained, which chiefly consists of a solution of ammonium thiosulfate, ammonium thiocyanate and some ammonium polythionates, is then heated under pressure to about 200° C. in a pressure resisting vessel, as described in my copending application for patent mentioned above. The thiocyanate is thereby converted as well as the thionates into ammonium sulfate and sulfur. I thus obtain an increase in the yield of ammonium sulfate formed from the ammonia in the gas, which amounts to 13,4 per cent, the nitrogen contents of the cyanogen compounds being also converted into ammonia.

*Example 2.*—A gas containing 8 grs. $NH_3$, 12 grs. $H_2S$ and 1,7 grs. cyanogen compounds (calculated as HCN) per cubicmeter is treated for instance as described with reference to Example 1. After the washing liquor is exhausted, the ammonium salt solution is separated from the ferric sulfide formed either by filtration or by decantation, centrifuging or the like. There is obtained an ammonium salt solution containing ammonium thiosulfate and ammonium thiocyanate in the molecular proportion of 4,24:1,00, the contents of salt varying within wide limits according to the manner of proceeding and to the concentration of the ammonia liquor. It is possible to increase the concentration of the salts in the solution to about 70 per cent.

If the solution contains for instance 460 grs. ammonium thiosulfate and 55,8 grs. ammonium thiocyanate per liter, 193,4 grs. sulfur dioxide per liter are introduced into the solution and the liquor thus treated is at once heated in an autoclave to 140–160° C. or preferably to about 200–220° C. The autoclave may either consist of a chromenickel-steel alloy resisting the action of sulfur dioxide or it may be lined with such alloy or with some other acid proof lining. The salts dissolved in the liquor are decomposed into ammonium sulfate, sulfur and carbon dioxide, 507 grs. ammonium sulfate, 196,6 grs. sulfur and 32,3 grs. carbon dioxide being recovered per liter of the original salt solution.

*Example 3.*—The salt solution is treated exactly as described with reference to Example 2, but 257,5 grs. sulfur dioxide are introduced per liter of the original solution. If the solution is then treated as described with reference to Example 2, there are obtained 10,7 grs. sulfur per liter of the original solution in excess of the quantity obtained according to Example 6. In other words instead of 196,6 grs. there are obtained 207,3 grs. sulfur, besides which are formed 65,4 grs. free sulfuric acid.

For the purpose of recovering neutral ammonium sulfate, this acid solution can be neutralized before evaporation with ammonia liquor or the like, or else the mother liquor rich in sulfuric acid, which remains over when evaporating, can be returned from time to time into the decomposition vessel to replace part of the sulfuric acid to be added.

*Example 4.*—A salt solution is treated as described with reference to Example 2, however the liquor is not heated at once, but is allowed to stand some time after the sulfur dioxide has been introduced. The thiosulfate in solution will then be gradually converted under the action of the sulfur dioxide into poly-thionates, in the first line tri- or tetrathionate. If the solution is then heated, which now mainly contains, instead of the thiosulfate and sulfur dioxide, polythionates and ammonium thiocyanate, the heating being effected as described with reference to Examples 2 or 3, exactly the same result will be obtained including the same quantities of ammonium sulfate, sulfur and carbon dioxide as in Example 2.

*Example 5.*—A solution as described with reference to Example 3, into which sulfur dioxide has been introduced, is treated exactly as described with reference to Example 4, and the same products are obtained as in Example 3.

*Example 6.*—To a solution as described with reference to Example 2, are added 997 grs. sulfuric acid of 20 per cent and the liquor is heated as described with reference to Example 2. There are formed 507 grs. ammonium sulfate, 163,9 grs. sulfur and 32,25 grs. carbon dioxide.

The latter example shows that a mixture of thiosulfate and ammonium thiocyanate can also be decomposed into sulfate and sulfur by adding sulfuric acid, and in consequence thereof the acid solutions of ammonium sulfate obtained according to Examples 3 and 5 can be treated further in such manner, that the mother liquors rich in sulfuric acid, which result after evaporation for the recovery of the sulfate, can be utilized for decomposing further quantities of thiosulfate—ammonium thiocyanate solutions. Therefore in this case part of the sulfur dioxide used according to Examples 2 to 5 may be replaced by sulfuric acid, 3 molecules $SO_2$ being replaced by 2 molecules $H_2SO_4$.

Obviously the proportions given in the examples need not to be the same throughout, but all such solutions can be treated for the recovery of sulfate and sulfur which contain, besides ammonium thiocyanate, ammonium thio-sulfate, sulfur dioxide, ammonium polythionate and sulfuric acid. Sulfites and bisulfites may also be present.

In calculating the composition of such solutions the following rules apply:

1. 1NH$_4$CNS is decomposed to form sulfate and sulfur by means of:
   (a) 2 molecules SO$_2$.
   (b) 2 molecules polythionate.
   (c) 2 molecules thiosulfate+3 molecules SO$_2$.
   (d) 8 molecules bisulfite.
   (e) 2 molecules thiosulfate+2 molecules H$_2$SO$_4$.

2. Thiosulfates, sulfites, bisulfites and polythionates are decomposed under the formation of sulfate and sulfur according to the following rules:
   (a) 2 molecules thiosulfate+1 molecule polythionate.
   (b) 2 molecules sulfite+1 molecule polythionate.
   (c) 2 molecules bisulfite+1molecule thiosulfate.
   (d) 2 molecules bisulfite+1molecule sulfite.

Any of these stocks may be mixed with each other in any desired proportion and in all cases sulfate and sulfur will result. If more sulfite or thiosulfate is present than corresponds to these prescriptions, non-decomposed thiosulfate and, if ammonium thiocyanate is present, also non-decomposed ammonium thiocyanate will remain in solution.

On the other hand if the solution contains more bisulfite or more polythionate than indicated above, there are formed besides sulfate and sulfur more or less free sulfuric acid and, if ammonium thiocyanate is present, also carbon dioxide. In such case, as shown above, the mother liquor rich in sulfuric acid which remains over when evaporating for the recovery of sulfate, is preferably returned into the decomposition vessel.

Various changes may be made in the details disclosed in the foregoing specification without departing from the invention or sacrificing the advantages thereof.

In the claims the terms "metal hydroxide of the iron group" and "metal thionate of the iron group" are intended to mean iron and manganese exclusively.

I claim:

1. The method of treating coke oven gases for the recovery therefrom of useful admixtures which comprises treating such gas with a solution of a metal thionate of the iron group, in which a metal hydroxide of the iron group is suspended, and maintaining in the washing liquor a content of such unconverted hydroxide substantially throughout the washing period.

2. The method of treating coke oven gases for the recovery therefrom of useful admixtures which comprises treating such gas with a solution of a metal thionate of the iron group, in which a metal hydroxide of the iron group is suspended, dividing the spent liquor and treating one part with air, the remaining part being treated with sulfur dioxide, removing sulfur from the part thus treated by filtration and remixing the liquors thus treated in a further operation.

3. The method of treating coke oven gases for the recovery therefrom of useful admixtures which comprises treating such gas with a solution of a metal thionate of the iron group, in which a metal hydroxide of the iron group is suspended, the proportion of hydroxide to thionate being substantially 1:2, dividing the spent liquors, treating about one-third with air, about two-thirds with sulfur dioxide, removing sulfur from the part thus treated by filtration and remixing the liquors thus treated in a further operation.

4. The method of treating coke oven gases for the recovery therefrom of useful admixtures which comprises treating such gas with a solution of iron thionate, in which ferric hydroxide is suspended, and maintaining in the washing liquor a content of such unconverted hydroxide substantially throughout the washing period.

5. The method of treating coke oven gases for the recovery therefrom of useful admixtures which comprises treating such gas with a solution of iron thionate, in which ferric hydroxide is suspended, dividing the spent liquor and treating one part with air, the remaining part being treated with sulfur dioxide, removing sulfur from the part thus treated by filtration and remixing the liquors thus treated in a further operation.

6. The method of treating coke oven gases for the recovery therefrom of useful admixtures which comprises treating such gas with a solution of iron thionate, in which ferric hydroxide is suspended, the proportion of hydroxide to thionate being substantially 1:2, dividing the spent liquors, treating about one-third with air, about two-thirds with sulfur dioxide, removing sulfur from the portion treated with sulfur dioxide by filtration and remixing the liquors thus treated in a further operation.

7. The method of removing ammonia and hydrogen sulfide and of recovering useful admixtures from a coke oven gas containing a greater percentage of hydrogen sulfide than corresponds to the proportion 2 mols. NH$_3$: 1 mol. H$_2$S, comprising treating such gas with a solution of a metal thionate of the iron group, in which at least as much of a metal hydroxide of the iron group is kept in suspension as is necessary for the absorption of the excess of hydrogen sulphide over said proportion.

In testimony whereof I affix my signature.

CHRISTIAN J. HANSEN.